United States Patent
Wang et al.

(10) Patent No.: US 7,502,192 B1
(45) Date of Patent: Mar. 10, 2009

(54) MAGNETIC DISK DRIVE AND METHOD FOR EFFICIENTLY DETERMINING AND STORING RRO COMPENSATION VALUES USING A SECONDARY MICRO-ACTUATOR

(75) Inventors: Zhi Wang, Irvine, CA (US); Min Chen, San Rafael, CA (US); Robert J. McNab, San Jose, CA (US); Jenghung Cheng, Cupertino, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 82 days.

(21) Appl. No.: 11/484,492

(22) Filed: Jul. 11, 2006

(51) Int. Cl.
  *G11B 21/02* (2006.01)
  *G11B 5/596* (2006.01)
(52) U.S. Cl. .................... 360/75; 360/76; 360/77.04
(58) Field of Classification Search ............... None
  See application file for complete search history.

(56) References Cited

U.S. PATENT DOCUMENTS

| | | | |
|---|---|---|---|
| 5,500,776 A | 3/1996 | Smith | |
| 5,781,381 A | 7/1998 | Koganezawa et al. | |
| 5,793,554 A | 8/1998 | Chainer et al. | |
| 5,796,558 A | 8/1998 | Hanrahan et al. | |
| 5,801,908 A | 9/1998 | Akiyama et al. | |
| 5,907,447 A | 5/1999 | Yarmchuk et al. | |
| 5,920,441 A * | 7/1999 | Cunningham et al. | 360/78.05 |
| 5,949,603 A | 9/1999 | Brown et al. | |
| 5,991,115 A | 11/1999 | Chainer et al. | |
| 6,005,738 A | 12/1999 | Chainer et al. | |
| 6,292,320 B1 * | 9/2001 | Mason et al. | 360/63 |
| 6,317,285 B1 | 11/2001 | Bi et al. | |
| 6,320,718 B1 | 11/2001 | Bouwkamp et al. | |
| 6,493,176 B1 | 12/2002 | Deng et al. | |
| 6,504,675 B1 | 1/2003 | Shukh et al. | |
| 6,519,107 B1 | 2/2003 | Ehrlich et al. | |
| 6,522,494 B1 | 2/2003 | Magee | |
| 6,538,836 B1 | 3/2003 | Dunfield et al. | |
| 6,542,326 B1 | 4/2003 | Ell et al. | |
| 6,631,046 B2 | 10/2003 | Szita et al. | |
| 6,633,451 B1 | 10/2003 | Chainer et al. | |
| 6,636,388 B2 | 10/2003 | Stefansky | |

(Continued)

OTHER PUBLICATIONS

Koganezawa, et al., "A Flexural Piggyback Milli-Actuator for Over 5 Gbit/in2 Density Magnetic Recording", pp. 3908-3910, Sep. 1996, IEEE Transactions on Magnetics, vol. 32, No. 5.

*Primary Examiner*—K. Wong (57) ABSTRACT

A method is disclosed for efficiently determining and writing repeatable runout (RRO) compensation value sets for data tracks on a magnetic disk in a disk drive. The disk drive has a magnetoresistive (MR) head having a read element and a separate write element, and a secondary actuator coupled to the end of a primary actuator for adjusting a head skew angle. In the method, the head skew angle is set such that the read and write elements are substantially aligned along the first track. A position error signal for each servo sector is determined over a predetermined number of disk revolutions during track following along a first data track. An RRO compensation value set is calculated for the first data track based on the position error signals. The RRO compensation value set is written for the first data track. A seek operation is then performed to a second data track.

10 Claims, 6 Drawing Sheets

U.S. PATENT DOCUMENTS

| | | |
|---|---|---|
| 6,680,810 B2 * | 1/2004 | Shiraishi et al. ............... 360/75 |
| 6,754,030 B2 * | 6/2004 | Seng et al. .................... 360/76 |
| 6,765,744 B2 | 7/2004 | Gomez et al. |
| 6,771,443 B2 | 8/2004 | Szita et al. |
| 6,778,348 B1 | 8/2004 | Carley |
| 6,798,610 B1 | 9/2004 | Deng et al. |
| 6,873,488 B2 * | 3/2005 | Teo et al. ................. 360/77.06 |
| 6,937,419 B2 | 8/2005 | Suk et al. |
| 6,963,465 B1 | 11/2005 | Melkote et al. |
| 7,215,514 B1 | 5/2007 | Yang et al. |
| 2001/0040752 A1 | 11/2001 | Szita et al. |
| 2004/0061967 A1 | 4/2004 | Lee et al. |
| 2004/0160696 A1 | 8/2004 | Meyer |
| 2004/0179289 A1 | 9/2004 | Suk et al. |

\* cited by examiner

FIG. 7A
(PRIOR ART)
IDEAL SERVO TRACKS

FIG. 7B
(PRIOR ART)
WRITTEN SERVO TRACKS

MAGNETIC DISK DRIVE AND METHOD FOR EFFICIENTLY DETERMINING AND STORING RRO COMPENSATION VALUES USING A SECONDARY MICRO-ACTUATOR

BACKGROUND OF THE INVENTION

1. Field of the Invention

The present invention relates to rotating magnetic disk drives, and more particularly, to techniques for efficiently determining and storing wedge repeatable runout (RRO) compensation values.

2. Description of the Prior Art and Related Information

Figure 7A:
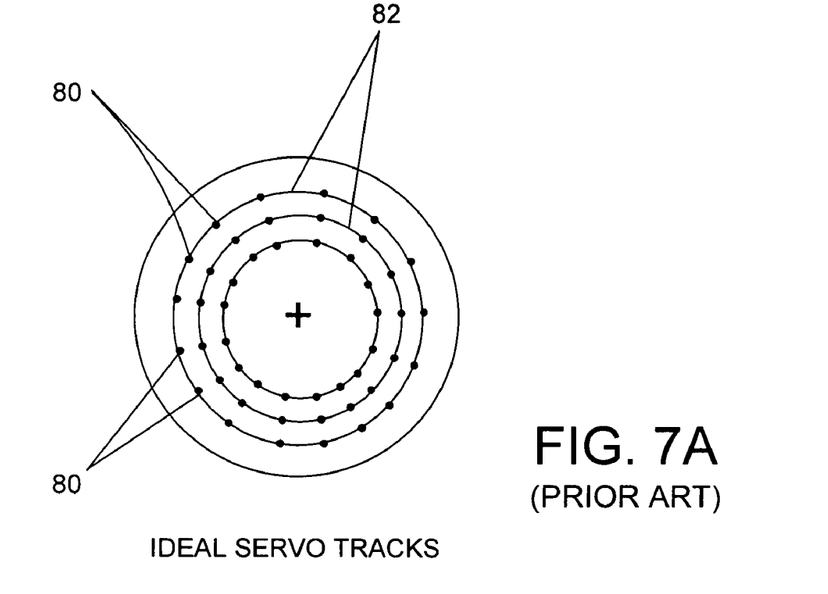
FIG. 7A is a schematic diagram illustrating ideal servo tracks on a disk of a disk drive.
Figure 7B:
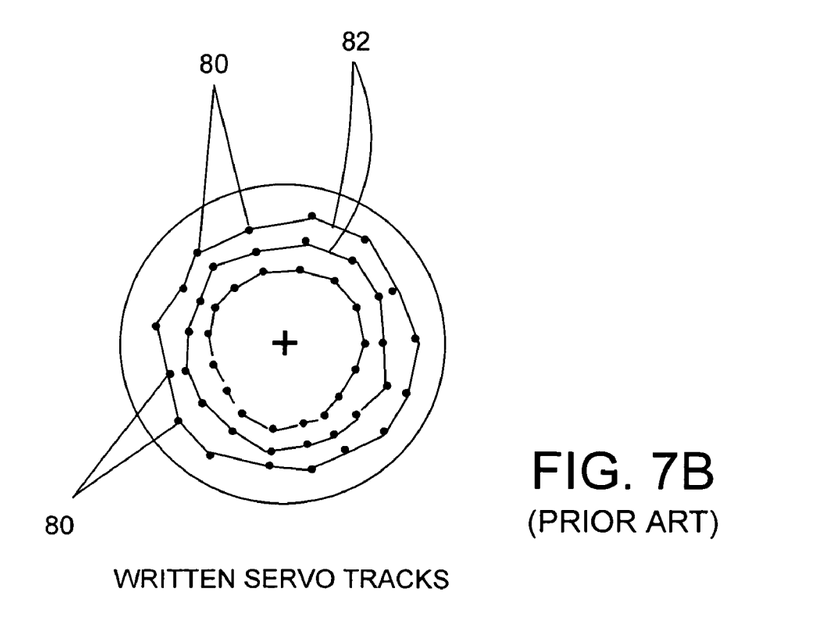
FIG. 7B is a schematic diagram illustrating written servo tracks exhibiting RRO.

With reference to FIGS. 7A and 7B, wedge repeatable runout (RRO) in a disk drive results from imperfections, with respect to a perfect circle, in the location of servo information 80 along a track 82 on a disk surface in the disk drive. During track following, the RRO imperfections have a detrimental effect on efforts by a head-position servo control loop to cause a transducer head to follow a perfect circle. The RRO imperfections are relatively static over time and the effects of the RRO may be attenuated by measuring the RRO and storing resulting RRO compensation values for later use by the head-position servo loop to compensate for the RRO.

Accordingly, there exists a need for a technique for efficiently determining and storing the RRO compensation values for significantly reducing the effects of RRO in a disk drive.

SUMMARY OF THE INVENTION

The present invention may be embodied in a method for determining and writing repeatable runout (RRO) compensation value sets for data tracks on a magnetic disk in a disk drive. The disk drive has the disk, an actuator arm, a voice coil motor (VCM) for rotating the actuator arm about a pivot, a magnetoresistive (MR) head having a read element and a separate write element, and a secondary actuator coupled to a distal end of the actuator arm for adjusting a skew angle for the head. Each data track includes a plurality of embedded servo sectors that define a circumferential path having repeatable runout error. In the method, during track following along a first data track, the skew angle for the MR head is set using the secondary actuator such that the read element and the write element are substantially aligned along the first data track. A position error signal for each servo sector is determined over a predetermined number of disk revolutions. A repeatable runout compensation value set is calculated for the first data track based on the position error signals determined during track following along the first data track. While continuing the step of track following along the first data track, the repeatable runout compensation value set is written for the first data track. A seek operation is then performed to a second data track.

In more detailed features of the invention, the secondary actuator may be a piezo-microactuator, or alternatively, an electromagnetic microactuator. The predetermined number of disk revolutions may be about six (6) disk revolutions, or it may be about eight (8) disk revolutions. The skew angle may be between about minus fifteen degrees and plus fifteen degrees.

The present invention also may be embodied in a related disk drive that further includes a control system. The control system sets the skew angle for the MR head using the secondary actuator such that, during a track following operation for determining and writing an RRO compensation value set for a followed track, the read element and the write element are substantially aligned along the followed track.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
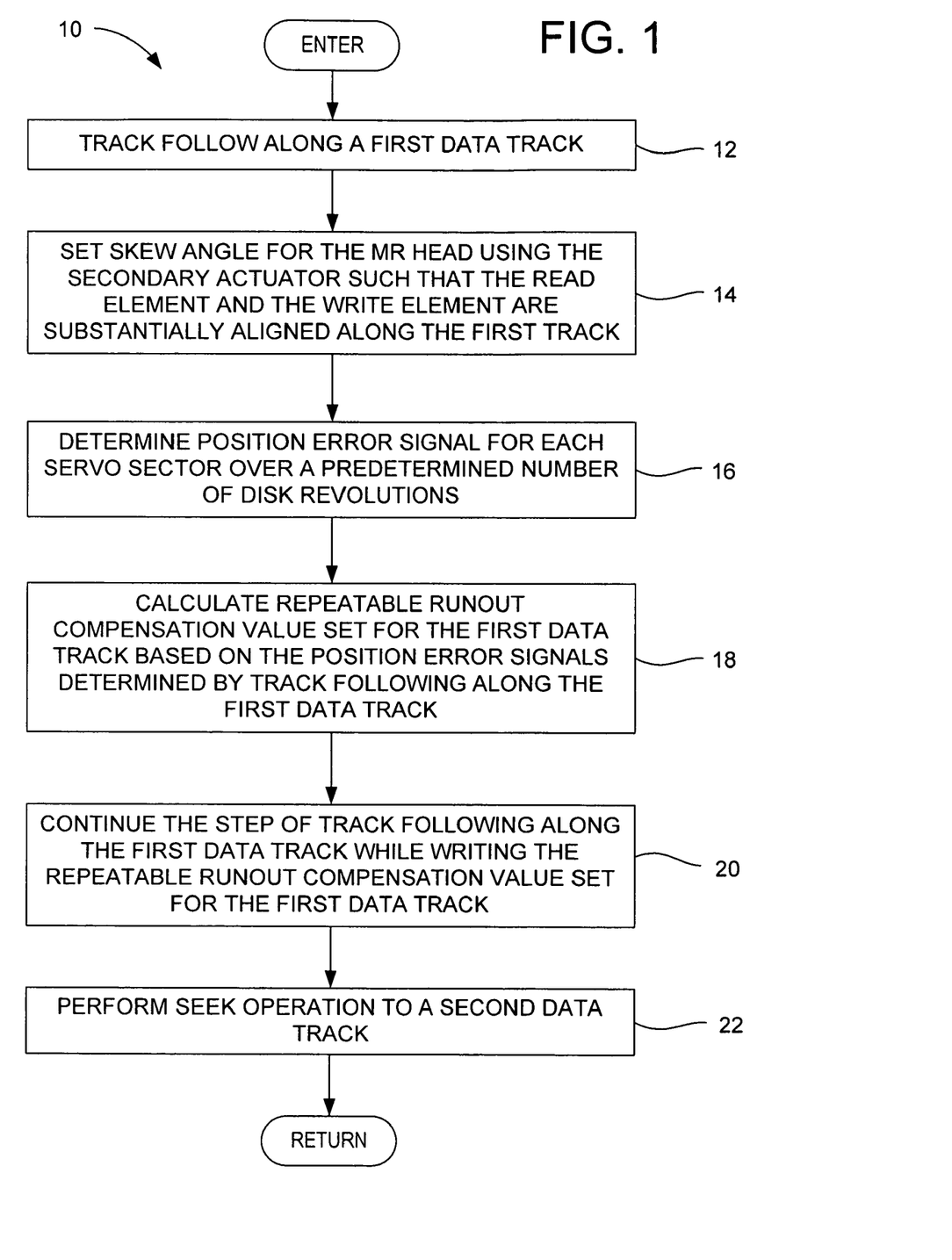
FIG. 1 is a flow diagram illustrating a method for efficiently determining and writing repeatable runout (RRO) compensation values, according to the present invention.
Figure 2:
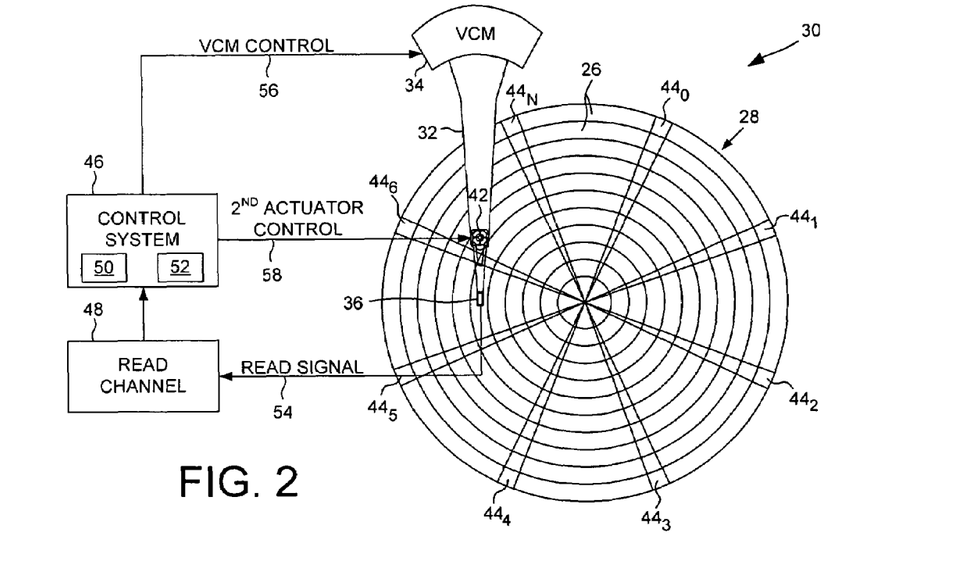
FIG. 2 is a block diagram of a disk drive including a voice coil motor (VCM) for actuating the MR head radially over the disk and a secondary actuator for adjusting a skew angle of the MR head for efficiently determining and writing RRO compensation values, according to the present invention.
Figure 3:
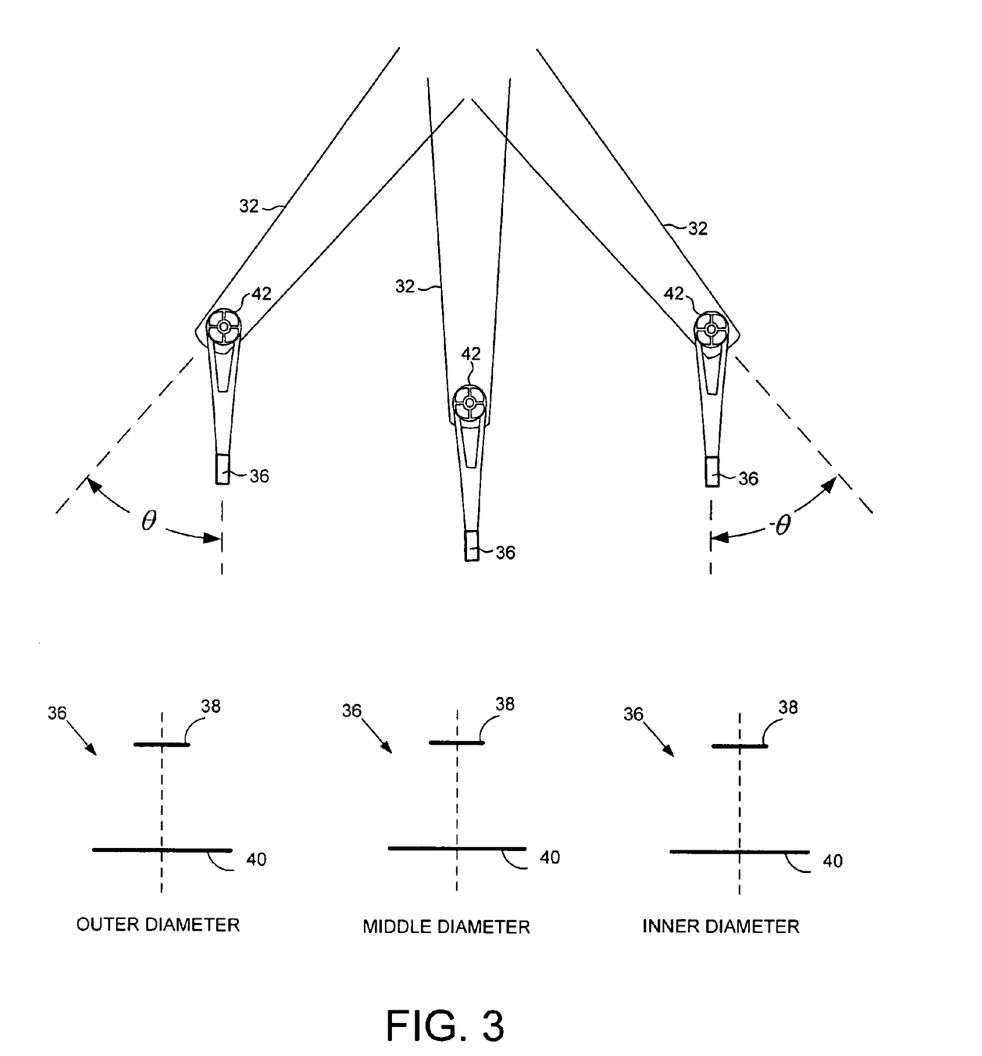
FIG. 3 is a schematic diagram illustrating use of the secondary actuator to eliminate head offset by setting the skew angle of the MR head, according to the present invention.

With reference to FIGS. 1 through 3, the present invention may be embodied in a method 10 (FIG. 1) for determining and writing repeatable runout (RRO) compensation value sets for data tracks 26 on a magnetic disk 28 in a disk drive 30 (FIG. 2). The disk drive has the disk, an actuator arm 32, a voice coil motor (VCM) 34 for rotating the actuator arm about a pivot, a magnetoresistive (MR) head 36 having a read element 38 and a separate write element 40, and a secondary actuator 42 coupled to a distal end of the actuator arm for adjusting a skew angle θ for the head (FIG. 3). Each data track includes a plurality of embedded servo sectors $44_N$ that define a circumferential path having repeatable runout error. In the method, during track following along a first data track (step 12), the skew angle for the MR head is set using the secondary actuator such that the read element and the write element are substantially aligned along the first data track (step 14). A position error signal for each servo sector is determined over a predetermined number of disk revolutions (step 16). A repeatable runout compensation value set is calculated for the first data track based on the position error signals determined during track following along the first data track (step 18). While continuing the step of track following along the first data track, the repeatable runout compensation value set is written for the first data track (step 20). A seek operation is then performed to a second data track (step 22).

Figure 5:
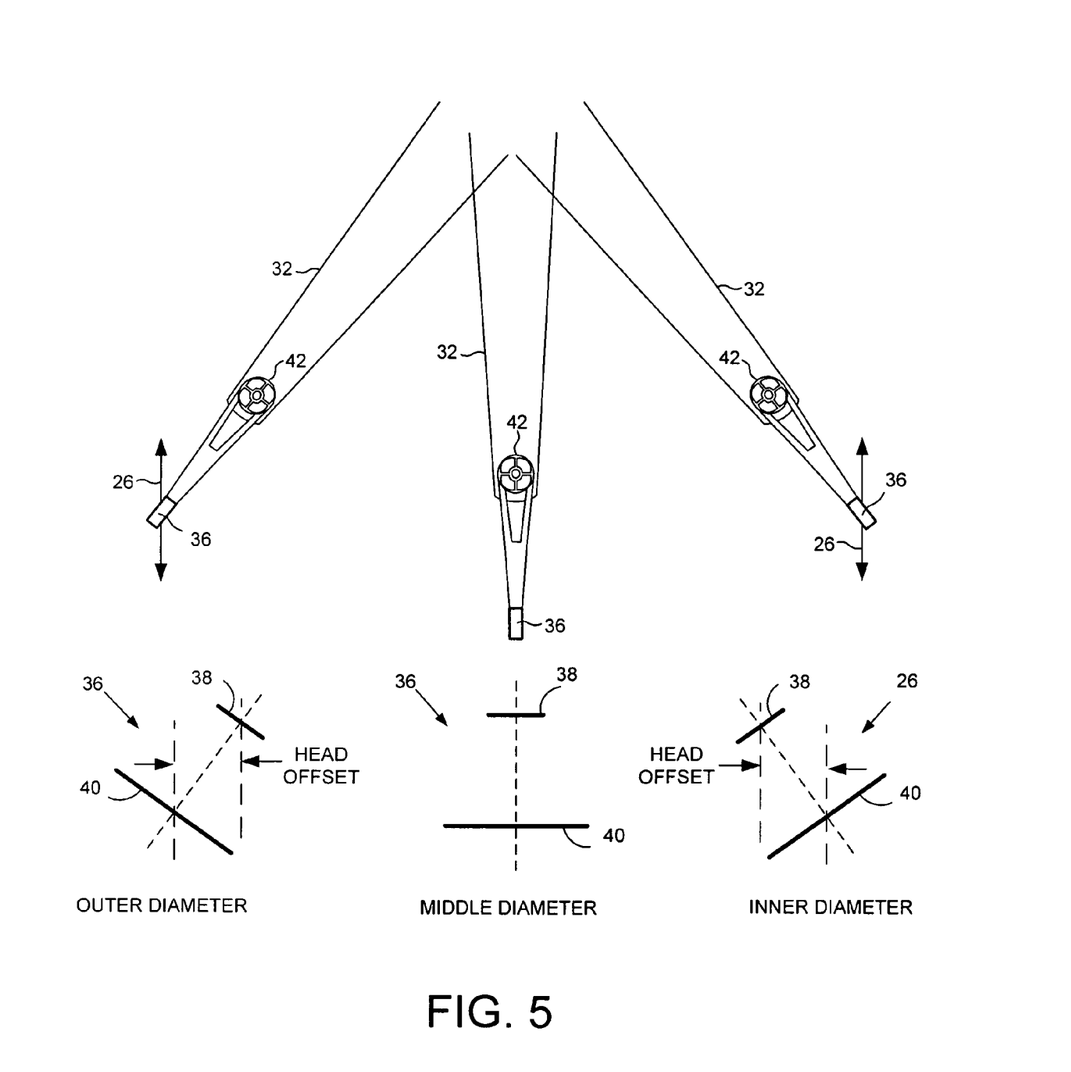
FIG. 5 is a schematic diagram illustrating how the head offset changes relative to the head offset changes relative to the skew angle of the head.

Any suitable secondary actuator 42 may be employed for setting the skew angle θ during the determining and writing of the RRO compensation values. For example, the secondary actuator may be a piezo-microactuator, or an electro-magnetic microactuator. More detailed descriptions of exemplary secondary actuators are disclosed in U.S. Pat. Nos. 6,538,836 and 6,636,388. Although the secondary actuator is shown in FIG. 3 as mounted on the actuator arm 32, other mounting configurations are possible such as mounting the secondary actuator on the slider or the like. It is contemplated that the secondary actuator may deflect plus or minus 15 degrees from an axis parallel to the actuator arm 32, which deflection should be sufficient to allow alignment of the read element 38 and the write element 40 across all of the data tracks 26. However, even if the secondary actuator does not have this range, substantial advantage in manufacturing throughput may be obtained by aligning the read element and the write element for a significant portion of the data tracks in a region of a middle diameter of the disk 28 while determining and writing the RRO compensation values.

Figure 4A:
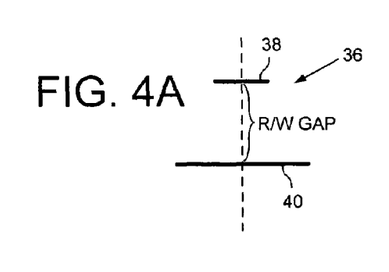
FIG. 4A is a schematic diagram of an MR head having a read element and a write element which are separated by a read/write gap.
Figure 4B:
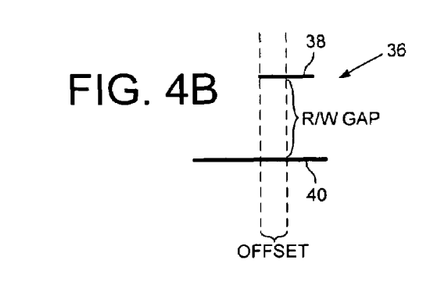
FIG. 4B is a schematic diagram of an MR head having a read element and a write element which are offset radially and separated by a read/write gap.

As shown in FIGS. 4A and 4B, the read element 38 and the write element 40 are spaced apart from each other by a read/write (R/W) gap. Also, the read element and the write element may be offset from each other, as shown in FIG. 4B. The offset may be by design, or it may be due to misalignment during manufacturing. For clarity of description, no such offset is shown in FIGS. 3 and 5.

The present invention takes advantage of an additional degree of freedom provided by the secondary actuator 42 to align the read element 38 with the write element 40. With reference to FIG. 5, during normal track following techniques, the read element and the write element are aligned (with respect to the data tracks) only at a middle diameter of the disk 28. At an outer diameter, the angle of the actuator causes an offset between the read element and the write element. Similarly, at an inner diameter, the angle of the actuator causes an opposite offset between the read element and the write element. When an offset exists, the read element is positioned to follow the track center during RRO determination. Then, to write the RRO compensation values to the disk, a seek (or jog) must be performed to position the write element over the target track. By using the secondary actuator to set a skew angle to align the read element and the write element, the offset seek may be eliminated. Advantageously, the elimination of the offset-caused seek for a substantial portion of the tracks may significantly improve manufacturing throughput during disk drive manufacture.

The predetermined number of disk revolutions for determining the position error signals used to calculate an RRO compensation value set may be about six (6) disk revolutions, or may be about eight (8) disk revolutions. A technique for effectively and efficiently determining RRO compensation values is disclosed in U.S. Pat. No. 6,999,267.

The present invention also may be embodied in a disk drive 30, as described above, that further includes a control system 46. The control system sets the skew angle θ for the MR head 36 using the secondary actuator 42 such that, during a track following operation for determining and writing an RRO compensation value set for a followed track, the read element 38 and the write element 40 are substantially aligned along the followed track 26. The control system is operable to perform the method steps set forth above and shown in FIG. 1. The control system includes a sampled servo controller, and circuitry and processors that control a head-disk assembly (HDA) which includes the disk 26, the VCM 34, the head 36, and the actuators, 32 and 42. The HDA further includes a spindle motor (not shown) and a read channel 48 coupled between the control system 46 and the head 36 for communicating a read signal 54. The servo controller implements a servo control loop which causes the head 36 to follow a desired path (or centerline) of the selected track 26 in an operation generally referred to as "track following." During normal track following, the path of the head wanders about the desired track path. The sampled servo controller reads track identification information and track position information from a servo sector 44 and uses that information to generate VCM control signals 56 for the VCM 34. The control system 46 also generates a secondary control signal 58 applied to the secondary actuator for fine positioning of the head 26. Typically, the servo controller attempts to limit the head wander to within a predetermined range defined by a "Track Misregistration" (TMR) budget. The position error signal PES is generated during track following, and, during disk drive operational use, the RRO compensation values 16 are used to modify the PES to reduce the effects of the WRRO to allow or improve track following.

During the method operations of the present invention, the control system biases the secondary control signal 58 to maintain a target skew angle θ for the head 36. Techniques for controlling the skew angle are disclosed in U.S. patent application Ser. No. 11/050,508, titled SERVO WRITING A DISK USING A SECONDARY ACTUATOR TO CONTROL SKEW ANGLE, which application is incorporated herein by reference.

The control system 46 also provides an intelligent interface between a host and the HDA for execution of read and write commands. The control system may have an internal microprocessor 50 and memory 52 for implementing the controllers and techniques related to the invention. Program code for implementing these techniques may be stored in nonvolatile memory and transferred to volatile random access memory (RAM) for execution by the microprocessor. The microprocessor and the supporting hardware of the disk drive comprise the means for implementing the functions of the disk drive.

The magnetic media surface of the disk 28 is accessed using the head 36. The tracks 26 on the media surface may be divided into storage segments. Each storage segment typically begins with a servo sector 44 which is followed by data sectors. The servo sector for a storage segment corresponds to an intersection with the radially-extending embedded servo wedges. The data sectors may include data blocks, each generally storing 512 data bytes. Each data block may be addressed using a logical block address (LBA).

Figure 6:
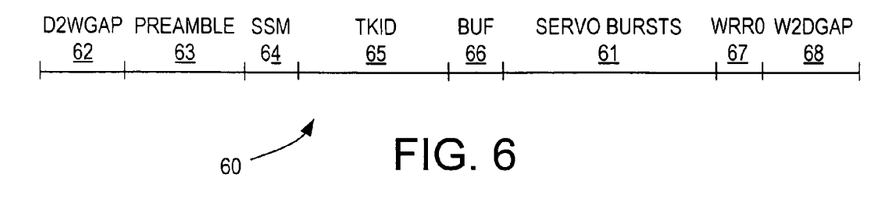
FIG. 6 is a data structure of a typical servo sector including RRO compensation information.

FIG. 6 conceptually presents the servo information that may be written in a servo sector 44, but the relative dimensions of the component fields are not drawn to scale. As shown, each servo sector contains a sequence of fields having various functions relative to locating and reading the servo information and implementing the servo control process. More particularly, each servo sector generally comprises a header region (not separately identified) followed by a servo burst field 61.

The header region fields include a data-to-wedge gap (D2WGAP) (or write splice) field 62, a preamble field 63 (often having an address mark field and an automatic gain control/phase locked oscillator field), a servo sync mark (SSM) field 64, a track identification (TKID) field 65, and a buffer (BUF) field 66. The header region is followed by the servo bursts, e.g. A, B, C, and D, that are circumferentially sequential and radially offset relative to a burst pair centerline. After the servo field 61 is a WRRO field 67, and a wedge-to-data gap (W2DGAP) field 68. The RRO compensation value set for each servo sector 44 is written to the WRRO field 67 of a prior servo sector.

What is claimed is:

1. A method for determining and writing repeatable runout (RRO) compensation value sets for data tracks on a magnetic disk in a disk drive, the disk drive having the disk, an actuator arm, a voice coil motor (VCM) for rotating the actuator arm about a pivot, a magnetoresistive (MR) head having a read element and a separate write element, and a secondary actuator coupled to a distal end of the actuator arm for adjusting a skew angle for the head, wherein each data track comprises a plurality of embedded servo sectors that define a circumferential path having repeatable runout error, the method comprising:

track following along a first data track;
   setting the skew angle for the MR head using the secondary actuator such that the read element and the write element are substantially aligned along the first data track;
   determining a position error signal for each servo sector over a predetermined number of disk revolutions;
   calculating a repeatable runout compensation value set for the first data track based on the position error signals determined by track following along the first data track;
   continuing the step of track following along the first data track while writing the repeatable runout compensation value set for the first data track; and
   performing a seek operation to a second data track.

2. A method for determining and writing repeatable runout (RRO) compensation value sets as defined in claim 1, wherein the secondary actuator comprises a piezo-microactuator.

3. A method for determining and writing repeatable runout (RRO) compensation value sets as defined in claim 1, wherein the secondary actuator comprises an electro-magnetic microactuator.

4. A method for determining and writing repeatable runout (RRO) compensation value sets as defined in claim 1, wherein the predetermined number of disk revolutions comprises about six disk revolutions.

5. A method for determining and writing repeatable runout (RRO) compensation value sets as defined in claim 1, wherein the predetermined number of disk revolutions comprises about eight disk revolutions.

6. A method for determining and writing repeatable runout (RRO) compensation value sets as defined in claim 1, wherein the skew angle is between about minus fifteen degrees and plus fifteen degrees.

7. A disk drive, comprising:
   a magnetic disk having data tracks, each data track including a plurality of embedded servo sectors that define a circumferential path having repeatable runout (RRO) error;
   an actuator arm;
   a voice coil motor (VCM) for rotating the actuator arm about a pivot;
   a magnetoresistive (MR) head having a read element and a separate write element;
   a secondary actuator coupled to a distal end of the actuator arm for adjusting a skew angle for the head; and
   a control system for setting the skew angle for the MR head using the secondary actuator such that, during a track following operation for determining and writing an RRO compensation value set for a followed track, the read element and the write element are substantially aligned along the followed track.

8. A disk drive as defined in claim 6, wherein the secondary actuator comprises a piezo-microactuator.

9. A disk drive as defined in claim 6, wherein the secondary actuator comprises an electro-magnetic microactuator.

10. A disk drive as defined in claim 6, wherein the skew angle is between about minus fifteen degrees and plus fifteen degrees.

* * * * *